US012797689B2

(12) United States Patent
Kojima et al.

(10) Patent No.: US 12,797,689 B2
(45) Date of Patent: Nov. 17, 2026

(54) GOLF BALL

(71) Applicant: Sumitomo Rubber Industries, Ltd., Kobe (JP)

(72) Inventors: Daijiro Kojima, Kobe (JP); Hikaru Nagakura, Kobe (JP); Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 163 days.

(21) Appl. No.: 18/937,179

(22) Filed: Nov. 5, 2024

(65) Prior Publication Data

US 2025/0144478 A1 May 8, 2025

(30) Foreign Application Priority Data

Nov. 6, 2023 (JP) ................................ 2023-189075

(51) Int. Cl.
*A63B 37/00* (2006.01)
*C08K 5/05* (2006.01)
*C08K 5/375* (2006.01)

(52) U.S. Cl.
CPC ...... *A63B 37/0075* (2013.01); *A63B 37/0051* (2013.01); *A63B 37/0063* (2013.01); *A63B 37/0064* (2013.01); *A63B 37/0065* (2013.01); *C08K 5/05* (2013.01); *C08K 5/375* (2013.01); *C08K 2201/012* (2013.01)

(58) Field of Classification Search
CPC ............ A63B 37/0075; A63B 37/0051; A63B 37/0063; A63B 37/0064; A63B 37/0065; A63B 37/0043; A63B 37/00621; A63B 37/00622; A63B 37/0074; A63B 37/0076; C08K 5/05; C08K 5/375; C08K 2003/2296; C08K 2003/3045; C08K 2201/012
See application file for complete search history.

(56) References Cited

U.S. PATENT DOCUMENTS 7,344,455 B1 3/2008 Higuchi
10,265,585 B2 * 4/2019 Mikura .................. C08K 5/372
2013/0029789 A1 * 1/2013 Sullivan ............. A63B 37/0075
473/376

* cited by examiner

*Primary Examiner* — Jeffrey D Carlson
(74) *Attorney, Agent, or Firm* — XSENSUS LLP

(57) ABSTRACT

A golf ball can include a core, a mid layer, and a cover. A hardness Hm of the mid layer can be larger than a hardness Hc of the cover. In a graph on which distances of and Shore C hardnesses at a central point of the core, six points between the central point and a surface of the core, and a point on the surface are plotted, a slope A1 of a straight line connecting the central point and a first point can be not less than 1.00. A maximum value Amax of absolute values of the following slopes A2 to A7 can be not greater than 0.90.

A2: a slope of a straight line connecting the first point and a second point.
A3: a slope of a straight line connecting the second point and a third point.
A4: a slope of a straight line connecting the third point and a fourth point.
A5: a slope of a straight line connecting the fourth point and a fifth point.
A6: a slope of a straight line connecting the fifth point and a sixth point.
A7: a slope of a straight line connecting the sixth point and the point on the surface.

18 Claims, 1 Drawing Sheet

GOLF BALL

CROSS REFERENCE TO RELATED APPLICATION(S)

The present application claims priority to Japanese patent application JP 2023-189075, filed on Nov. 6, 2023, the entire content of which is incorporated herein by reference in its entirety.

BACKGROUND

Technical Field

The present specification discloses a golf ball including a core, a mid layer, and a cover.

Background Art

An interest to golf players concerning golf balls may be flight performance. Golf players may thus place importance mainly on a flight distance upon a shot with a driver. Feel at impact of golf balls may also be important for golf players. Golf players may thus place importance on feel at impact when golf balls are hit with a short iron and a putter.

When a golf ball is hit with a golf club, the golf ball begins to fly with an initial speed, a launch angle, and spin. A golf ball having a high initial speed can be advantageous in terms of flight performance. The initial speed can correlate with the resilience coefficient of the golf ball. A golf ball having a high resilience coefficient may be regarded as having excellent flight performance.

To achieve a large flight distance, appropriate flight duration and an appropriate trajectory height can be required. By an appropriate launch angle and an appropriate spin rate, appropriate flight duration and an appropriate trajectory height can be achieved. A golf ball whose flight duration and trajectory height are highly dependent on a launch angle can have appropriate lift force and drag acting on the golf ball during flight. The golf ball whose flight duration and trajectory height are highly dependent on a launch angle can be regarded as having better flight performance than a golf ball whose flight duration and trajectory height are highly dependent on a spin rate.

The resilience coefficient, the launch angle, and the initial spin of a golf ball can depend on the hardness distribution of the golf ball. A conventional hardness distribution that can contribute to a high resilience coefficient can lead to excessive spin. The flight performance of the conventional golf balls may thus not be regarded as sufficient.

The feel at impact can also depend on the hardness distribution. The conventional hardness distribution that can contribute to a high resilience coefficient may be regarded as not being able to achieve excellent feel at impact. The conventional golf balls may not sufficiently achieve both flight performance and feel at impact.

SUMMARY

A golf ball according to one or more aspects of the present disclosure can include a core having a diameter of not less than 35 mm, a mid layer positioned outside the core, and a cover positioned outside the mid layer. A Shore D hardness Hm of the mid layer can be larger than a Shore D hardness Hc of the cover. In a graph on which distances (mm) of and Shore C hardnesses at a central point of the core, a first point whose distance from the central point is 2.5 mm, a second point whose distance from the central point is 5.0 mm, a third point whose distance from the central point is 7.5 mm, a fourth point whose distance from the central point is 10.0 mm, a fifth point whose distance from the central point is 12.5 mm, a sixth point whose distance from the central point is 15.0 mm, and a point on a surface of the core, are plotted, a slope A1 of a straight line connecting the central point and the first point can be not less than 1.00. A maximum value Amax of absolute values of the following slopes A2 to A7 can be not greater than 0.90.

A2: a slope of a straight line connecting the first point and the second point.

A3: a slope of a straight line connecting the second point and the third point.

A4: a slope of a straight line connecting the third point and the fourth point.

A5: a slope of a straight line connecting the fourth point and the fifth point.

A6: a slope of a straight line connecting the fifth point and the sixth point.

A7: a slope of a straight line connecting the sixth point and the point on the surface.

DETAILED DESCRIPTION

Figure 1:
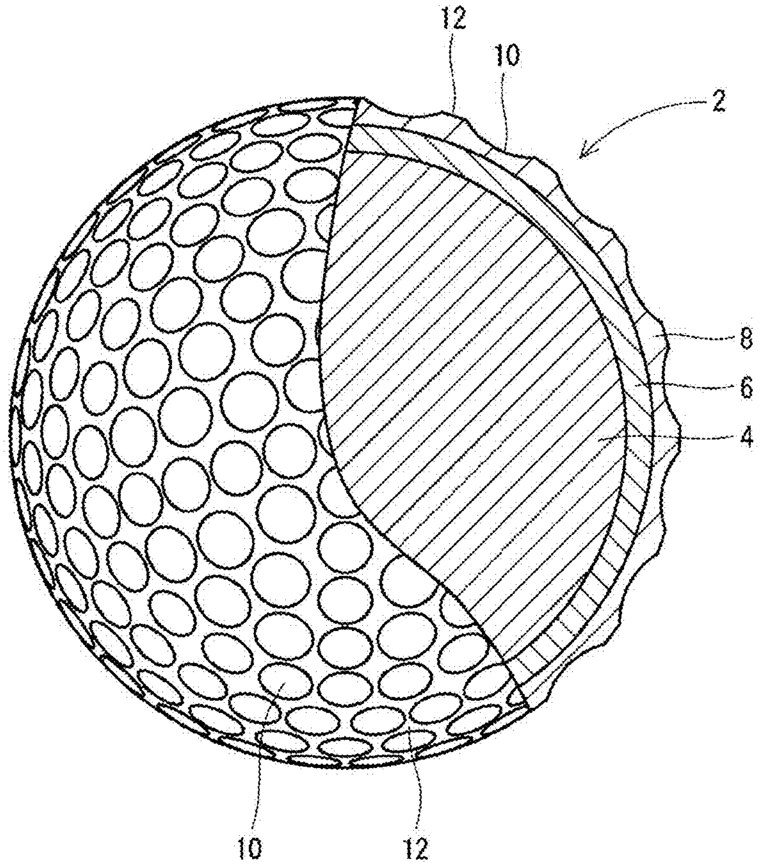
FIG. 1 is a partially cutaway cross-sectional view showing a golf ball according to one or more embodiments of the present disclosure.

Hereinafter, preferred embodiments will be described in detail with appropriate reference to the drawing.

It can be regarded as an intention of the applicant, according to one or more intentions, to provide a golf ball having excellent flight performance upon a shot with a driver and excellent feel at impact upon putting.

The golf ball according to one or more embodiments of the present disclosure can thus be regarded as having excellent flight performance upon a shot with a driver and excellent feel at impact upon putting.

Golf Ball

A golf ball 2 shown in FIG. 1, according to one or more embodiments, can include a spherical core 4, a mid layer 6 positioned outside the core 4, and a cover 8 positioned outside the mid layer 6. The golf ball 2 can have a plurality of dimples 10 on the surface thereof. Of the surface of the golf ball 2, a part other than the dimples 10 can be regarded as a land 12. The golf ball 2 can include a paint layer and a mark layer on the external side of the cover 8.

The golf ball 2 can have a diameter of not less than 40 mm and not greater than 45 mm, according to one or more embodiments of the present disclosure. From the viewpoint of conformity to the rules established by the United States Golf Association (USGA), for instance, the diameter can be not less than 42.67 mm. From the viewpoint of suppression of air resistance, for instance, the diameter can be not greater than 44 mm, such as not greater than 42.80 mm.

The golf ball 2 can have a mass of not less than 40 g and not greater than 50 g, according to one or more embodiments of the present disclosure. From the viewpoint of attainment of inertia that may be regarded as suitable (e.g., "great" inertia), for instance, the mass can be not less than 44 g, for instance, not less than 45.00 g. From the viewpoint of conformity to the rules established by the USGA, for instance, the mass can be not greater than 45.93 g.

Core

The core 4 can be formed by crosslinking a rubber composition. The rubber composition can contain, comprise, or consist of:

(a) a base rubber,
(b) a co-crosslinking agent,
(c) a crosslinking initiator, and
(d) a radical scavenger.

Base Rubber

Examples of base rubbers for the rubber composition can include polybutadienes, polyisoprenes, styrene-butadiene copolymers, ethylene-propylene-diene copolymers, and natural rubbers. From the viewpoint of resilience performance of the golf ball, for instance, 2, polybutadienes may be preferable. When a polybutadiene and another rubber are used in combination, it may be preferred if the polybutadiene is a principal component. According to one or more embodiments of the present disclosure, the proportion of the polybutadiene to the entire base rubber can be not less than 50% by mass, more preferably not less than 70% by mass, and particularly preferably not less than 80% by mass. A polybutadiene in which the proportion of cis-1,4 bonds is not less than 80% may be implemented as one example. A polybutadiene can contain 1,2-vinyl bonds. From the viewpoint of the resilience performance of the golf ball 2, for instance, the content of 1,2-vinyl bonds in the polybutadiene can be not greater than 2.0% by mass, more preferably not greater than 1.7% by mass, and particularly preferably not greater than 1.5% by mass.

Co-Crosslinking Agent

Examples of co-crosslinking agents can include α,β-unsaturated carboxylic acids and metal salts thereof. These co-crosslinking agents can crosslink rubber molecules by graft polymerization. An α,β-unsaturated carboxylic acid and an α,β-unsaturated carboxylic acid metal salt may be used in combination. The number of carbon atoms in each of α,β-unsaturated carboxylic acids and metal salts thereof can be not less than 2 and not greater than 8, as an example range. Examples of preferable α,β-unsaturated carboxylic acids can include acrylic acid, methacrylic acid, fumaric acid, maleic acid, and crotonic acid.

Examples of metal ions for α,β-unsaturated carboxylic acid metal salts can include: monovalent metal ions such as those of sodium, potassium, and lithium; divalent metal ions such as those of magnesium, calcium, zinc, barium, and cadmium; trivalent metal ions such as that of aluminum; tin ion; and zirconium ion. Two or more types of metal ions may be used in combination. From the viewpoint of easily crosslinking rubber molecules, for instance, divalent metal ions may be implemented. Specific examples of co-crosslinking agents can include zinc acrylate, magnesium acrylate, zinc methacrylate, and magnesium methacrylate. Zinc acrylate may be particularly implemented according to one or more embodiments of the present disclosure. Two or more co-crosslinking agents may be used in combination.

The amount of the co-crosslinking agent per 100 parts by mass of the base rubber can be not less than 20 parts by mass and not greater than 55 parts by mass, as an example range. With a core in which the amount of the co-crosslinking agent is in this range, an appropriate hardness can be achieved. From the viewpoint of hardness, for instance, this amount can be more preferably not less than 23 parts by mass and particularly preferably not less than 26 parts by mass. From the same viewpoint, for instance, this amount can be more preferably not greater than 50 parts by mass and particularly preferably not greater than 45 parts by mass.

Crosslinking Initiator

A crosslinking initiator according to one or more embodiments of the present disclosure can be an organic peroxide. The organic peroxide can contribute to the durability and the resilience performance of the golf ball 2. Examples of suitable organic peroxides can include dicumyl peroxide, 1,1-di(t-butylperoxy)cyclohexane, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility can be dicumyl peroxide. Two or more crosslinking initiators may be used in combination.

The amount of the crosslinking initiator per 100 parts by mass of the base rubber can be not less than 0.2 parts by mass and not greater than 5.0 parts by mass, as an example range. With a core in which the amount of the crosslinking initiator is in this range, an appropriate hardness can be achieved. This golf ball can be regarded as having excellent durability. From this viewpoint, for instance, this amount can be more preferably not less than 0.5 parts by mass and particularly preferably not less than 0.7 parts by mass. From the same viewpoint, for instance, this amount can be more preferably not greater than 2.5 parts by mass and particularly preferably not greater than 2.0 parts by mass.

Radical Scavenger

The radical scavenger can stop radical chain reactions in the rubber composition. The radical scavenger can achieve an appropriate hardness of the core 4 and can inhibit the crosslinking density of the core 4 from being excessive. Examples of radical scavengers can include a hindered phenol-based compound (d1) and a hindered amine-based compound (d2). The rubber composition may contain both the hindered phenol-based compound (d1) and the hindered amine-based compound (d2).

Hindered Phenol-Based Compound

The hindered phenol-based compound can have a hydroxyphenyl structure. The hydroxyphenyl structure can include a hydroxy group and a bulky functional group. The functional group can be adjacent to the hydroxy group, according to one or more embodiments of the present disclosure. Examples of the bulky functional group can include a t-butyl group and a long-chain alkyl group. In the long-chain alkyl group, some of carbon atoms may be substituted with sulfur. A hindered phenol-based compound according to one or more embodiments can have a tert-butylhydroxyphenyl structure. An exemplary hindered phenol-based compound can have a di-tert-butylhydroxyphenyl structure.

Examples of the tert-butylhydroxyphenyl structure can include 3-tert-butyl-4-hydroxyphenyl and 3,5-di-tert-butyl-4-hydroxyphenyl. A hindered phenol-based compound having a 3,5-di-tert-butyl-4-hydroxyphenyl structure may be particularly implemented.

Examples of a hindered phenol-based compound having one hydroxyphenyl structure can include dibutylhydroxytoluene (BHT), 4,6-bis(octylthiomethyl)-o-cresol, 4,6-bis((dodecylthio)methyl)-o-cresol, 2,4-dimethyl-6-(1-methylpentadecyl)phenol (e.g., Irganox (registered trademark) 1141, manufactured by BASF JAPAN LTD.), and octadecyl-3-(3,5-di-t-butyl-4-hydroxyphenyl)propionate (e.g., ADK STAB (registered trademark) AO-50, manufactured by ADEKA CORPORATION).

Examples of a hindered phenol-based compound having two hydroxyphenyl structures can include 2,2'-methylenebis(4-ethyl-6-tert-butylphenol) (e.g., YOSHINOX (registered trademark) 425, manufactured by Mitsubishi Chemical Corporation), 2,2'-methylenebis(4-methyl-6-tert-butylphenol) (e.g. SANDANT (registered trademark) 2246, manufactured by SANSHIN CHEMICAL INDUSTRY CO., LTD.), 4,4'-butylidenebis(3-methyl-6-tert-butylphenol) (e.g., YOSHINOX BB, manufactured by Mitsubishi Chemical Corporation), 4,4'-thiobis(3-methyl-6-tert-butylphenol) (e.g., NOCRAC (registered trademark) 300, manufactured by OUCHI SHINKO CHEMICAL INDUSTRIAL CO., LTD.), 4,4-methylenebis(2,6-di-tert-butylphenol), 2,6-di-tert-butyl-4-((2-((3,5-di-tert-butyl-4-hydroxyphenyl)sulfanyl)propan-2-yl)sulfanyl)phenol (probucol), and 3,9-bis(2-(3-(3-tert-butyl-4-hydroxy-5-methylphenyl)propionyloxy)-1,1-dimethylethyl)-2,4,8,10-tetraoxaspiro(5.5)undecane (e.g., ADK STAB AO-80, manufactured by ADEKA CORPORATION).

Examples of a hindered phenol-based compound having three hydroxyphenyl structures can include 1,3,5-tris-(3,5-di-tert-butyl-4-hydroxybenzyl)-1,3,5-triazine-2,4,6(1H,3H,5H-)-trione (e.g., ADK STAB AO-20, manufactured by ADEKA CORPORATION) and 1,3,5-trimethyl-2,4,6-tris(3,5-di-t-butyl-4-hydroxybenzyl)benzene (e.g., ADK STAB AO330, manufactured by ADEKA CORPORATION).

An example of a hindered phenol-based compound having four hydroxyphenyl structures can be pentaerythritol tetrakis(3-(3,5-di-tert-butyl-4-hydroxyphenyl)propionate) (e.g., ADK STAB AO-60, manufactured by ADEKA CORPORATION).

An example of another hindered phenol-based compound can be 2-tert-butyl-6-(3-tert-butyl-2-hydroxy-5-methylbenzyl)-4-methylphenyl acrylate (e.g., SUMILIZER GM, manufactured by SUMITOMO CHEMICAL CO., LTD.).

Exemplary hindered phenol-based compounds can be 4,4'-butylidenebis(3-methyl-6-tert-butylphenol), 2,6-di-tert-butyl-4-((2-((3,5-di-tert-butyl-4-hydroxyphenyl)sulfanyl)propan-2-yl)sulfanyl)phenol, and 2-tert-butyl-6-(3-tert-butyl-2-hydroxy-5-methylbenzyl)-4-methylphenyl acrylate. An example of a particular hindered phenol-based compound can be 4,4'-butylidenebis(3-methyl-6-tert-butylphenol).

Two or more hindered phenol-based compounds may be used in combination in the rubber composition.

Hindered Amine-Based Compound

An exemplary hindered amine-based compound can have a 2,2,6,6-tetramethyl-4-piperidyl group represented by the following chemical formula (1).

[Chem. 1]

(1)

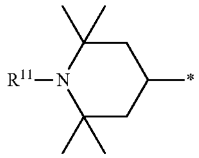

In the chemical formula (1), $R^{11}$ represents a hydrogen atom, a hydroxy group, an alkyl group, a hydroxyalkyl group, an alkoxy group, a hydroxyalkoxy group, or an oxyradical, and * represents a bond. The number of carbon atoms in each of the alkyl group, the hydroxyalkyl group, the alkoxy group, and the hydroxyalkoxy group can be not less than 1 and not greater than 30, as an example range.

Compounds represented by the chemical formula (1) can include those represented by the following chemical formula (2) and chemical formula (3).

[Chem. 2]

(2)

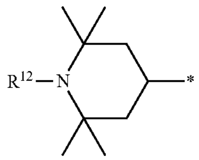

In the chemical formula (2), $R^{12}$ represents a hydrogen atom, a hydroxy group, an alkyl group, a hydroxyalkyl group, or an oxyradical, and * represents a bond. The number of carbon atoms in each of the alkyl group and the hydroxyalkyl group can be not less than 1 and not greater than 30, as an example range. A hindered amine-based compound including a structure represented by the chemical formula (2) can be referred to as N-alkyl type hindered amine-based compound or NH type hindered amine-based compound.

[Chem. 3]

(3)

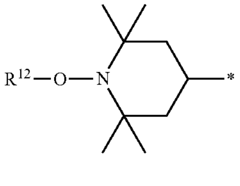

In the chemical formula (3), $R^{12}$ represents an alkyl group or a hydroxyalkyl group, and * represents a bond. The number of carbon atoms in each of the alkyl group and the hydroxyalkyl group is not less than 1 and not greater than 30, as an example range. A hindered amine-based compound including a structure represented by the chemical formula (3) can be referred to as N-alkoxy type hindered amine-based compound.

Specific examples of hindered amine-based compounds can include compounds represented by the following chemical formulae (4) to (6).

[Chem. 4]

(4)

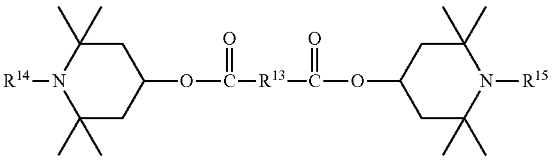

In the chemical formula (4), $R^{13}$ represents an alkylene group, and $R^{14}$ and $R^{15}$ each represent a hydrogen atom, a hydroxy group, an alkyl group, a hydroxyalkyl group, an alkoxy group, a hydroxyalkoxy group, or an oxyradical. The number of carbon atoms in each of the alkylene group, the alkyl group, the hydroxyalkyl group, the alkoxy group, and the hydroxyalkoxy group is not less than 1 and not greater than 30, as an example range.

[Chem. 5]

(5)

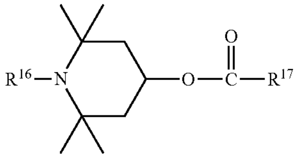

In the chemical formula (5), $R^{16}$ represents a hydrogen atom, a hydroxy group, an alkyl group, a hydroxyalkyl group, an alkoxy group, a hydroxyalkoxy group, or an oxyradical, and $R^{17}$ represents an alkyl group or an alkenyl group. The number of carbon atoms in each of the alkyl group, the hydroxyalkyl group, the alkoxy group, and the hydroxyalkoxy group is not less than 1 and not greater than 30, as an example range. The number of carbon atoms in the alkenyl group is not less than 2 and not greater than 30, as an example range.

[Chem. 6]

(6)

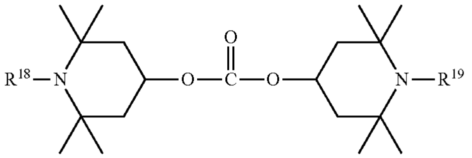

In the chemical formula (6), $R^{18}$ and $R^{19}$ each represent a hydrogen atom, a hydroxy group, an alkyl group, a hydroxyalkyl group, an alkoxy group, a hydroxyalkoxy group, or an oxyradical. The number of carbon atoms in each of the alkyl group, the hydroxyalkyl group, the alkoxy group, and the hydroxyalkoxy group is not less than 1 and not greater than 30, as an example range.

Specific examples of hindered amine-based compounds can include the following products of ADEKA CORPORATION.

(1) ADK STAB LA-52

Tetrakis(1,2,2,6,6-pentamethyl-4-piperidyl)butane-1,2,3,4-tetracarboxylate (2) ADK STAB LA-57

Tetrakis(2,2,6,6-tetramethyl-4-piperidyl)butane-1,2,3,4-tetracarboxylate (3) ADK STAB LA-63P (4) ADK STAB LA-68

(5) ADK STAB LA-72

Bis(1,2,2,6,6-pentamethyl-4-piperidyl)sebacate (6) ADK STAB LA-77Y

Bis(2,2,6,6-tetramethyl-4-piperidyl)sebacate (7) ADK STAB LA-81

Bis(1-undecanoxy-2,2,6,6-tetramethylpiperidin-4-yl)carbonate

Other specific examples of hindered amine-based compounds can include the following products of BASF JAPAN LTD.

(1) Chimassorb 2020FDL 1,6-Hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (2) Chimassorb 944 FDL Poly((6-((1,1,3,3-tetramethylbutyl)amino)-1,3,5-triazine-2,4-diyl)((2,2,6,6-tetramethyl-4-piperidinyl)imino)-1,6-hexanediyl((2,2,6,6-tetramethyl-4-piperidinyl)imino))

(3) Tinuvin 622SF

Butanedioic acid, dimethylester, polymer with 4-hydroxy-2,2,6,6-tetramethyl-1-piperidine ethanol (4) Tinuvin PA144

Bis(1,2,2,6,6-pentamethyl-4-piperidinyl)-2-butyl-2-(4-hydroxy-3,5-di-tert-butylbenzyl)propanedioate Two or more hindered amine-based compounds may be used in combination in the rubber composition.

The amount of the radical scavenger per 100 parts by mass of the base rubber can be not less than 0.5 parts by mass and not greater than 4.0 parts by mass, as an example range. With a core in which the amount of the radical scavenger is in this range, an appropriate crosslinking density can be achieved. This golf ball can be regarded as having excellent durability. From this viewpoint, for instance, this amount can be more preferably not less than 0.6 parts by mass and particularly preferably not less than 0.7 parts by mass. From the same viewpoint, for instance, this amount can be more preferably not greater than 2.0 parts by mass and particularly preferably not greater than 1.8 parts by mass.

Organic Sulfur Compound

The rubber composition of the core 4 can contain an organic sulfur compound. The organic sulfur compound can contributes to the resilience performance of the golf ball 2. Examples of the organic sulfur compound can include thiols, polysulfides, thiurams, thiocarboxylic acids, dithiocarboxylic acids, sulfenamides, dithiocarbamates, and thiazoles. Thiols include thiophenols and thionaphthols.

Examples of thiophenols can include: thiophenol; thiophenols substituted with fluoro groups such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with chloro groups such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with bromo groups such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with iodine groups such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. According to one or more embodiments, metal salts can be zinc salts.

Examples of thionaphthols include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Divalent metal salts are preferable. According to one or more embodiments, metal salts can be zinc salts. Particularly exemplary thionaphthols can be 2-thionaphthol, 1-thionaphthol, zinc salt of 1-thionaphthol, and zinc salt of 2-thionaphthol.

Polysulfides can be organic sulfur compounds having polysulfide bonds. Polysulfides can include disulfides, trisulfides, and tetrasulfides. Exemplary polysulfides can be diphenylpolysulfides.

Examples of diphenylpolysulfides can include: diphenyldisulfide; diphenyldisulfides substituted with halogen groups such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl) disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pentachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetra bromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, and bis(pentaiodophenyl)disulfide; and diphenyldisulfides substituted with alkyl such groups as bis(4-methylphenyl)disulfide, bis(2,4,5-trimethylphenyl) disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of thiurams can include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylene thiuram tetrasulfide.

An example of thiocarboxylic acids can be naphthalene thiocarboxylic acid.

An example of dithiocarboxylic acids can be naphthalene dithiocarboxylic acid.

Examples of sulfenamides can include N-cyclohexyl-2-benzothiazole sulfenamide, N-oxydiethylene-2-benzothiazole sulfenamide, and N-t-butyl-2-benzothiazole sulfenamide.

Exemplary organic sulfur compounds can be thiophenols, metal salts of thiophenols, thionaphthols, metal salts of thionaphthols, diphenyldisulfides, and thiuram disulfides. Specific examples of organic sulfur compounds can include 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, bis(pentabromophenyl)disulfide, and zinc salts thereof.

Two or more organic sulfur compounds may be used in combination in the rubber composition.

The amount of the organic sulfur compound per 100 parts by mass of the base rubber can be not less than 0.05 parts by mass and not greater than 5.0 parts by mass, according to one or more embodiments of the present disclosure. A rubber composition in which the amount of the organic sulfur compound is in this range can be regarded as having excellent processability. A uniform core can be obtained from this rubber composition. From this viewpoint, for instance, this amount can be more preferably not less than 0.2 parts by mass and particularly preferably not less than 0.3 parts by mass. From the same viewpoint, for instance, this amount can be more preferably not greater than 3.0 parts by mass and particularly preferably not greater than 2.0 parts by mass.

Additive

The rubber composition of the core 4 may contain a filler, for instance, for the purpose of specific gravity adjustment and the like. Examples of suitable fillers can include zinc oxide, barium sulfate, calcium carbonate, and magnesium carbonate. The amount of the filler can be determined as appropriate so that the intended specific gravity of the core 4 can be achieved.

The rubber composition of the core 4 may contain various additives, such as sulfur, a carboxylic acid, a carboxylate, an anti-aging agent, a coloring agent, a plasticizer, a dispersant, and the like, in an adequate amount. The rubber composition may contain crosslinked rubber powder or synthetic resin powder.

Properties of Core

The core 4 can have a diameter of not less than 35.0 mm and not greater than 40.5 mm, as an example range. The golf ball 2 that includes the core 4 having a diameter of not less than 35.0 mm can be regarded as having excellent resilience performance. From this viewpoint, for instance, the diameter can be more preferably not less than 36.0 mm and particularly preferably not less than 36.5 mm. The golf ball 2 that includes the core 4 having a diameter of not greater than 40.5 mm can be regarded as having excellent durability. From this viewpoint, for instance, the diameter can be more preferably not greater than 40.0 mm and particularly preferably not greater than 39.5 mm.

The core 4 can have an amount of compressive deformation Dc of not less than 3.0 mm and not greater than 5.0 mm, as an example range. The golf ball 2 that includes the core 4 having an amount of compressive deformation Dc of not less than 3.0 mm can be regarded as having excellent feel at impact upon a shot with a driver. From this viewpoint, for instance, the amount of compressive deformation Dc can be more preferably not less than 3.5 mm and particularly preferably not less than 3.8 mm. The golf ball 2 that includes the core 4 having an amount of compressive deformation Dc of not greater than 5.0 mm can be regarded as having excellent resilience performance. From this viewpoint, for instance, the amount of compressive deformation Dc can be more preferably not greater than 4.7 mm and particularly preferably not greater than 4.5 mm.

The amount of compressive deformation Dc can be measured with a YAMADA type compression tester "SCH." In the tester, the core 4 can be placed on a rigid plate made of metal. Next, a cylinder made of metal can gradually descend toward the core 4. The core 4 can be squeezed between the bottom face of the cylinder and the hard plate and become deformed. A movement distance of the cylinder, starting from the state in which an initial load of 98 N is applied to the core 4 up to the state in which a final load of 1274 N is applied thereto, for instance, can be measured. A movement speed of the cylinder until the initial load is applied can be 0.83 mm/s, as an example. A movement speed of the cylinder after the initial load is applied until the final load is applied can be 1.67 mm/s, as an example.

Hardness Distribution of Core

Figure 2:
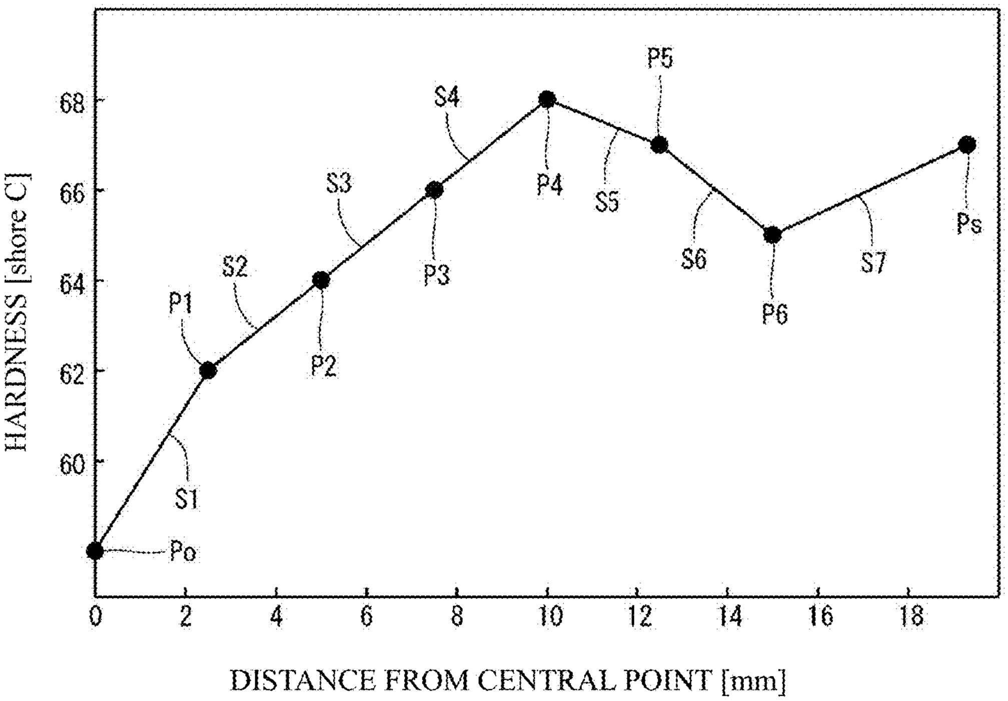
FIG. 2 is a graph showing the hardness distribution of a core of the golf ball in FIG. 1.

FIG. 2 is a graph showing an exemplary hardness distribution of the core 4 according to one or more embodiments of the present disclosure. In this graph, the horizontal axis indicates a distance from the central point of the core 4, and the vertical axis indicates a hardness (Shore C). The following points are plotted on this graph.

Central point Po

First point P1 whose distance from the central point is 2.5 mm

Second point P2 whose distance from the central point is 5.0 mm

Third point P3 whose distance from the central point is 7.5 mm

Fourth point P4 whose distance from the central point is 10.0 mm

Fifth point P5 whose distance from the central point is 12.5 mm

Sixth point P6 whose distance from the central point is 15.0 mm

Point Ps on the surface of the core 4

In the present specification, the following hardnesses are measured.

Ho: a hardness at the central point Po

H(2.5): a hardness at the first point P1

H(5.0): a hardness at the second point P2

H(7.5): a hardness at the third point P3

H(10.0): a hardness at the fourth point P4

H(12.5): a hardness at the fifth point P5

H(15.0): a hardness at the sixth point P6

Hs: a hardness at the point Ps on the surface

The hardness Ho at the central point Po and the hardnesses at the first point P1 to the sixth point P6 can be measured with a Shore C type hardness scale mounted to an automated hardness meter (trade name "Digi Test II" manufactured by Heinrich Bareiss Prüfgerätebau GmbH). The hardness scale can be pressed against the cross-section of a hemisphere obtained by cutting the golf ball 2. The measurement can be conducted in an environment of 23 °C.

The hardness Hs at the point Ps on the surface can be measured with a Shore C type hardness scale mounted to the above-described trade name "Digi Test II." The hardness scale can be pressed against the surface of the core 4. The measurement can be conducted in an environment of 23 °C.

According to one or more embodiments of the present disclosure, the hardnesses can be as follows.

Ho: 58

H(2.5): 62

H(5.0): 64

H(7.5): 66

H(10.0): 68

H(12.5): 67

H(15.0): 65

Hs: 67

The hardness Ho can be not less than 56 and not greater than 68, for instance, more preferably not less than 57 and not greater than 67, and particularly preferably not less than 58 and not greater than 66. The hardness H(2.5) can be not less than 60 and not greater than 70, more preferably not less than 61 and not greater than 69, and particularly preferably not less than 62 and not greater than 68, for instance. The hardness H(5.0) can be not less than 62 and not greater than 72, more preferably not less than 63 and not greater than 71, and particularly preferably not less than 64 and not greater than 70, for instance. The hardness H(7.5) can be not less than 63 and not greater than 73, more preferably not less than 64 and not greater than 72, and particularly preferably not less than 65 and not greater than 71, for instance. The hardness H(10.0) can be not less than 64 and not greater than 74, more preferably not less than 65 and not greater than 73, and particularly preferably not less than 66 and not greater than 72, for instance. The hardness H(12.5) can be not less than 63 and not greater than 76, more preferably not less than 64 and not greater than 75, and particularly preferably not less than 65 and not greater than 74, for instance. The hardness H(15.0) can be not less than 61 and not greater than 77, more preferably not less than 62 and not greater than 76, and particularly preferably not less than 63 and not greater than 75, for instance. The hardness Hs can be not less than 63 and not greater than 81, more preferably not less than 64 and not greater than 80, and particularly preferably not less than 65 and not greater than 79, for instance.

In FIG. 2, straight lines S1 to S7 are shown.

S1: a straight line connecting the central point Po and the first point P1

S2: a straight line connecting the first point P1 and the second point P2

S3: a straight line connecting the second point P2 and the third point P3

S4: a straight line connecting the third point P3 and the fourth point P4

S5: a straight line connecting the fourth point P4 and the fifth point P5

S6: a straight line connecting the fifth point P5 and the sixth point P6

S7: a straight line connecting the sixth point P6 and the point Ps on the surface The straight lines S1 to S7 can have slopes A1 to A7, respectively. The calculation expressions of the slopes A1 to A7 can be as follows.

The slope A1 of the straight line S1

$$(H(2.5)-Ho)/2.5=1.60$$

The slope A2 of the straight line S2

$$(H(5.0)-H(2.5))/2.5=0.80$$

The slope A3 of the straight line S3

$$(H(7.5)-H(5.0))/2.5=0.80$$

The slope A4 of the straight line S4

$$(H(10.0)-H(7.5))/2.5=0.80$$

The slope A5 of the straight line S5

$$(H(12.5)-H(10.0))/2.5=-0.40$$

The slope A6 of the straight line S6

$$(H(15.0)-H(12.5))/2.5=-0.80$$

The slope A7 of the straight line S7

$$(Hs-H(15.0))/4.3=0.47$$

The slope A1 of the core 4 can be greater than 1.00, for instance. In other words, the hardness of the core 4 can be regarded as change a relatively large amount (e.g., significantly) in the vicinity of the central point Po. The core 4 can contribute to the feel at impact of the golf ball 2. Furthermore, the core 4 can reduce an initial spin rate. Therefore, the core 4 can contribute to the flight performance of the golf ball 2. From these viewpoints, for instance, the slope A1 can be not less than 1.10 and particularly preferably not less than 1.20. From the viewpoint of the durability of the golf ball 2, for instance, the slope A1 can be not greater than 4.00, more preferably not greater than 3.00, and particularly preferably not greater than 2.50.

In the present embodiment, the minimum value of the slopes A2 to A7 can be −0.80, for instance. Furthermore, the maximum value of the slopes A2 to A7 can be 0.80, for instance. The slopes A2 to A7 can each be not less than −0.90 and not greater than 0.90, for instance. A maximum value Amax of the absolute values of the slopes A2 to A7 can be not greater than 0.90, for instance. In other words, the hardness may be regarded as not changing rapidly from the first point P1 to the surface. When the golf ball 2 is hit with a golf club, the energy loss can be small in the core 4. The core 4 can contribute to the resilience performance of the golf ball 2. The golf ball 2 can be regarded as having excellent flight performance. From this viewpoint, for instance, the maximum value Amax can be not greater than 0.85 and particularly preferably not greater than 0.80.

From FIG. 2, for instance, the hardness Hs at the surface can be larger than the hardness Ho at the central point Po. The core 4 can be regarded as having excellent feel at impact upon a shot with a driver. From this viewpoint, for instance, the difference (Hs−Ho) can be not less than 5, more preferably not less than 6, and particularly preferably not less than 7. From the viewpoint of the resilience performance of the golf ball 2, for instance, the difference (Hs−Ho) can be less than 15, more preferably not greater than 14, and particularly preferably not greater than 13.

Mid Layer

The mid layer 6 is positioned outside the core 4. According to one or more embodiments, the mid layer 6 can be in contact with the core 4. The mid layer 6 can be formed from a resin composition. For instance, the mid layer 6 can be formed from a thermoplastic resin composition. Examples of the base polymer of the resin composition can include ionomer resins, polyamide resins, thermoplastic polyester elastomers, thermoplastic polyurethane elastomers, thermoplastic polyolefin elastomers, and thermoplastic polystyrene elastomers. Ionomer resins and polyamide resins may be particularly implemented. Ionomer resins may be regarded as highly elastic. The golf ball 2 that includes the mid layer 6 containing an ionomer resin can be regarded as having excellent resilience performance. The mid layer 6 containing a polyamide resin can be regarded as being highly rigid. By this mid layer 6, an appropriate hardness distribution of the sphere comprising or consisting of the core 4 and the mid layer 6 can be achieved.

Examples of ionomer resins can include a binary ionomer resin and a ternary ionomer resin. The binary ionomer resin can be a binary copolymer that is formed with an α-olefin and an α,β-unsaturated carboxylic acid having 3 to 8 carbon atoms, for instance, and at least some of the carboxyl groups of this copolymer are neutralized with metal ions. A binary ionomer resin can contain 80% by mass or greater and 90% by mass or less of an α-olefin, and 10% by mass or greater and 20% by mass or less of an α,β-unsaturated carboxylic acid. This binary ionomer resin can be regarded as having excellent resilience performance. The ternary ionomer resin can be a ternary copolymer that is formed with an α-olefin, an α,β-unsaturated carboxylic acid having 3 to 8 carbon atoms, for instance, and an α,β-unsaturated carboxylic acid ester having 2 to 22 carbon atoms, for instance, and at least some of the carboxyl groups of this copolymer are neutralized with metal ions. A ternary ionomer resin can contain 70% by mass or greater and 85% by mass or less of an α-olefin, 5% by mass or greater and 30% by mass or less of an α,β-unsaturated carboxylic acid, and 1% by mass or greater and 25% by mass or less of an α,β-unsaturated carboxylic acid ester. This ternary ionomer resin can be regarded as having excellent resilience performance. For the binary ionomer resin and the ternary ionomer resin, α-olefins can be ethylene and propylene, while α,β-unsaturated carboxylic acids can be acrylic acid and methacrylic acid. Copolymers can be a binary copolymer formed with ethylene and acrylic acid and a binary copolymer formed with ethylene and methacrylic acid.

Examples of metal ions for use in neutralization of the carboxyl groups included in the binary ionomer resin and the ternary ionomer resin can include sodium ions, potassium ions, lithium ions, zinc ions, calcium ions, magnesium ions, aluminum ions, and neodymium ions. The neutralization may be carried out with two or more types of metal ions. Particularly suitable metal ions from the viewpoint of resilience performance and durability of the golf ball 2, for instance, can be sodium ions, zinc ions, lithium ions, and magnesium ions.

Specific examples of ionomer resins can include trade names “HIMILAN 1555”, “HIMILAN 1557”, “HIMILAN 1605”, “HIMILAN 1702”, “HIMILAN 1706”, “HIMILAN 1707”, “HIMILAN 1855”, “HIMILAN 1856”, “HIMILAN 8150”, “HIMILAN AM7311”, “HIMILAN AM7315”, “HIMILAN AM7317”, “HIMILAN AM7327”, “HIMILAN AM7329”, and “HIMILAN AM7337”, manufactured by DOW-MITSUI POLYCHEMICALS CO., LTD.; trade names “SURLYN 6120”, “SURLYN 6910”, “SURLYN 7930”, “SURLYN 7940”, “SURLYN 8140”, “SURLYN 8150”, “SURLYN 8940”, “SURLYN 8945”, “SURLYN 9120”, “SURLYN 9150”, “SURLYN 9320”, “SURLYN 9910", "SURLYN 9945", "SURLYN AD8546", "HPF1000", and "HPF2000", manufactured by DuPont de Nemours, Inc.; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

A polyamide resin can have a plurality of amide bonds ((—NH—CO—) in the main chain. Examples of polyamide resins can include aliphatic polyamides, aromatic polyamides, and amide copolymers. Examples of aliphatic polyamides include polyamide 6, polyamide 11, polyamide 12, polyamide 66, polyamide 610, polyamide 6T, polyamide 6I, polyamide 9T, polyamide M5T, and polyamide 612. Examples of aromatic polyamides include poly-p-phenylene terephthalamide and poly-m-phenylene isophthalamide. Examples of amide copolymers can include polyether block amide copolymers, polyester amide copolymers, polyether ester amide copolymers, and polyamide-imide copolymers. Aliphatic polyamides may be preferable, and polyamide 6, polyamide 11, and polyamide 12 are particularly preferable.

The amount of the ionomer resin in the base resin of the mid layer 6 can be not less than 10% by mass and not greater than 70% by mass, and the amount of the polyamide resin in the base resin of the mid layer 6 can be preferably not less than 30% by mass and not greater than 90% by mass. The amount of the ionomer resin can be not less than 15% by mass and particularly preferably not less than 20% by mass. The amount of the ionomer resin can be more preferably not greater than 65% by mass and particularly preferably not greater than 60% by mass. The amount of the polyamide resin can be more preferably not less than 35% by mass and particularly preferably not less than 40% by mass. The amount of the polyamide resin can be more preferably not greater than 85% by mass and particularly preferably not greater than 80% by mass.

The resin composition of the mid layer 6 may contain a coloring agent, a filler, a dispersant, an antioxidant, an ultraviolet absorber, a light stabilizer, a fluorescent material, a fluorescent brightener, etc., in an adequate amount. A typical filler can be barium sulfate. In the case where the hue of the golf ball 2 is white, a typical coloring agent can be titanium dioxide.

The mid layer 6 can have a thickness Tm of not less than 0.5 mm and not greater than 2.0 mm, as an example range. The golf ball 2 in which the thickness Tm is not less than 0.5 mm can be regarded as having excellent resilience performance. From this viewpoint, for instance, the thickness Tm can be not less than 0.7 mm and particularly preferably not less than 0.8 mm. The golf ball 2 in which the thickness Tm is not greater than 2.0 mm can be regarded as having excellent feel at impact upon a shot with a driver. From this viewpoint, for instance, the thickness Tm can be not greater than 1.5 mm and particularly preferably not greater than 1.3 mm. The thickness Tm can be measured at a position immediately below the land 12.

The mid layer 6 can have a hardness Hm of not less than 50 and not greater than 90, as an example range. The golf ball 2 in which the hardness Hm is not less than 50 can be regarded as having excellent resilience performance. From this viewpoint, for instance, the hardness Hm can be not less than 60 and particularly preferably not less than 63. The golf ball 2 in which the hardness Hm is not greater than 90 can be regarded as having excellent feel at impact upon a shot with a driver. From this viewpoint, for instance, the hardness Hm can be not greater than 80 and particularly preferably not greater than 72.

The hardness Hm of the mid layer 6 can be measured according to the standards of "ASTM-D 2240-68," for instance. The hardness Hm can be measured with a Shore D type hardness scale mounted to an automated hardness meter (e.g., trade name "Digi Test II" manufactured by Heinrich Bareiss Prüfgerätebau GmbH). For the measurement, a sheet that is formed by hot press, which can be formed from the same material as that of the mid layer 6, and can have a thickness of about 2 mm, may be used. Prior to the measurement, the sheet may be kept at 23 °C for two weeks, for instance. At the time of measurement, three sheets can be stacked.

Cover

The cover 8 is positioned outside the mid layer 6. According to one or more embodiments, the cover 8 can be in contact with the mid layer 6. The golf ball 2 may have an adhesive layer between the mid layer 6 and the cover 8. The cover 8 can be firmly joined to the mid layer 6 via this adhesive layer. The cover 8 can be formed from a resin composition. According to one or more embodiments, the cover 8 can be formed from a thermoplastic resin composition. Examples of the base polymer of the resin composition can include ionomer resins, thermoplastic polystyrene elastomers, thermoplastic polyester elastomers, thermoplastic polyamide elastomers, thermoplastic polyurethane elastomers, and thermoplastic polyolefin elastomers. Ionomer resins may be regarded as highly elastic. The golf ball 2 that includes the cover 8 containing an ionomer resin may be regarded as having excellent resilience performance. The golf ball 2 can be regarded as having excellent flight performance upon a shot with a driver. The ionomer resins described above for the mid layer 6 can be used for the cover 8.

An ionomer resin and another resin may be used in combination. In this case, from the viewpoint of resilience performance, for instance, the ionomer resin can be contained as the principal component of the base resin. The amount of the ionomer resin in the base resin of the cover 8 can be preferably not less than 60% by mass, more preferably not less than 70% by mass, and particularly preferably not less than 75% by mass.

An exemplary resin that can be used in combination with an ionomer resin can be a styrene block-containing thermoplastic elastomer. The styrene block-containing thermoplastic elastomer can contribute to the low hardness of the cover 8.

The styrene block-containing thermoplastic elastomer may contain a polystyrene block as a hard segment, and a soft segment. A typical soft segment can be a diene block. Examples of compounds for the diene block can include butadiene, isoprene, 1,3-pentadiene, and 2,3-dimethyl-1,3-butadiene. Two or more of the compounds may be used in combination.

Examples of styrene block-containing thermoplastic elastomers can include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS can include styrene-ethylene-propylene-styrene block copolymers (SEPS). Examples of hydrogenated SIBS can include styrene-ethylene-ethylene-propylene-styrene block copolymers (SEEPS).

According to one or more embodiments, styrene block-containing thermoplastic elastomers can include an alloy of an olefin and one or more members selected from the group consisting of SBS, SIS, SIBS, SEBS, SEPS, and SEEPS. The olefin component in the alloy may be presumed to contribute to improvement of compatibility with another base polymer. The alloy can contribute to the resilience performance of the golf ball 2. An olefin having 2 to 10 carbon atoms, for instance, may be implemented. Examples of suitable olefins can include ethylene, propylene, butene, and pentene. Ethylene and propylene are particularly preferable.

Specific examples of polymer alloys can include trade names "TEFABLOC T3221C", "TEFABLOC T3339C", "TEFABLOC SJ4400N", "TEFABLOC SJ5400N", "TEFABLOC SJ6400N", "TEFABLOC SJ7400N", "TEFABLOC SJ8400N", "TEFABLOC SJ9400N", and "TEFABLOC SR04", manufactured by Mitsubishi Chemical Corporation. Other specific examples of styrene block-containing thermoplastic elastomers include trade name "EPOFRIEND A1010" manufactured by Daicel Corporation, and trade name "SEPTON HG-252" manufactured by Kuraray Co., Ltd.

The resin composition of the cover 8 may contain a coloring agent, a filler, a dispersant, an antioxidant, an ultraviolet absorber, a light stabilizer, a fluorescent material, a fluorescent brightener, etc., in an adequate amount. A typical filler can be barium sulfate. In the case where the hue of the golf ball 2 is white, a typical coloring agent can be titanium dioxide.

The cover 8 can have a thickness Tc of not less than 0.50 mm and not greater than 2.00 mm, for instance. The golf ball 2 in which the thickness Tc is not less than 0.50 mm can be regarded as having excellent durability. From this viewpoint, for instance, the thickness Tc can be not less than 0.70 mm and particularly preferably not less than 0.90 mm. The golf ball 2 in which the thickness Tc is not greater than 2.00 mm can be regarded as having excellent resilience performance. From this viewpoint, for instance, the thickness Tc can be more preferably not greater than 1.50 mm and particularly preferably not greater than 1.20 mm. The thickness Tc can be measured at a position immediately below the land 12.

The cover 8 can have a hardness Hc of not less than 45 and not greater than 80, for instance. The golf ball 2 in which the hardness Hc is not less than 45 can be regarded as having excellent resilience performance. From this viewpoint, for instance, the hardness Hc can be preferably not less than 55 and particularly preferably not less than 58. The golf ball 2 in which the hardness Hc is not greater than 80 can be regarded as having excellent durability. From this viewpoint, for instance, the hardness Hc can be not greater than 70 and particularly preferably not greater than 67. The hardness Hc of the cover 8 can be measured by the same measurement method as for the hardness Hm of the mid layer 6.

According to one or more embodiments, the hardness Hm of the mid layer 6 can be larger than the hardness Hc of the cover 8. The golf ball 2 can achieve both desired flight performance upon a shot with a driver and desired feel at impact upon putting. The difference (Hm−Hc) can be preferably not less than 2, more preferably not less than 3, and particularly preferably not less than 4. The difference (Hm−Hc) can be preferably not greater than 10, more preferably not greater than 8, and particularly preferably not greater than 6.

Properties of Golf Ball

The golf ball 2 can have an amount of compressive deformation Db of not less than 2.5 mm and not greater than 4.0 mm, for instance. The golf ball 2 having an amount of compressive deformation Db of not less than 2.5 mm can be regarded as having excellent feel at impact upon a shot with a driver. From this viewpoint, for instance, the amount of compressive deformation Db can be preferably not less than 2.7 mm and particularly preferably not less than 2.8 mm. The golf ball 2 having an amount of compressive deformation Db of not greater than 4.0 mm can be regarded as having excellent resilience performance. From this viewpoint, for instance, the amount of compressive deformation Db can be more preferably not greater than 3.5 mm and particularly preferably not greater than 3.2 mm.

The amount of compressive deformation Db can be measured with the aforementioned YAMADA type compression tester "SCH." In the tester, the golf ball 2 can be placed on a rigid plate made of metal. Next, a cylinder made of metal can gradually descend toward the golf ball 2. The golf ball 2 can be squeezed between the bottom face of the cylinder and the hard plate and become deformed. A movement distance of the cylinder, starting from the state in which an initial load of 98 N is applied to the golf ball 2 up to the state in which a final load of 1274 N is applied thereto, can be measured. A movement speed of the cylinder until the initial load is applied can be 0.83 mm/s, as an example. A movement speed of the cylinder after the initial load is applied until the final load is applied can be 1.67 mm/s, as an example.

EXAMPLES

Example 1

A rubber composition C was obtained by kneading 100 parts by mass of a high-cis polybutadiene (trade name "BR-730", manufactured by JSR Corporation), 27.2 parts by mass of zinc acrylate (trade name "ZN-DA90S", manufactured by NISSHOKU TECHNO FINE CHEMICAL CO., LTD.), 5 parts by mass of zinc oxide (product of INDO LYSAGHT), 17.6 parts by mass of barium sulfate (product number "BD", manufactured by SAKAI CHEMICAL INDUSTRY CO., LTD.), 1.2 parts by mass of dicumyl peroxide (trade name "PERCUMYL D", manufactured by NOF CORPORATION), 1.0 part by mass of 4,4'-butylidenebis(3-methyl-6-tert-butylphenol) (product of Tokyo Chemical Industry Co., Ltd.) as a radical scavenger, and 0.35 parts by mass of a pentachlorothiophenol zinc salt (product number "PCTP-Zn", manufactured by FUJIFILM Wako Pure Chemical Corporation) as an organic sulfur compound. This rubber composition C was placed into a mold including upper and lower mold halves each having a hemispherical cavity, and heated to obtain a core with a diameter of 38.6 mm. The crosslinking temperature was 170 °C The crosslinking time was 20 minutes. The hardness distribution of the core is shown in Table 1 below.

A resin composition f was obtained by kneading 40 parts by mass of an ionomer resin (aforementioned "HIMILAN AM7337"), 20 parts by mass of another ionomer resin (aforementioned "HIMILAN 1555"), 40 parts by mass of polyamide 6 (product of Toray Industries, Inc.), 6 parts by mass of barium sulfate, and 4 parts by mass of titanium dioxide with a twin-screw kneading extruder. The core was placed into a mold including upper and lower mold halves each having a hemispherical cavity. The melted resin composition f was injected so as to cover the core in an injection molding machine to form a mid layer. The thickness of the mid layer was 1.00 mm.

A resin composition c was obtained by kneading 40 parts by mass of an ionomer resin (aforementioned "HIMILAN AM7329"), 50 parts by mass of another ionomer resin (aforementioned "HIMILAN AM7337"), 5 parts by mass of still another ionomer resin (aforementioned "HIMILAN 1555"), 5 parts by mass of a styrene block-containing thermoplastic elastomer (aforementioned "TEFABLOC T3221"), 6 parts by mass of barium sulfate, and 4 parts by mass of titanium dioxide with a twin-screw kneading extruder. The sphere consisting of the core and the mid layer was placed into a mold including upper and lower mold halves each having a hemispherical cavity. The melted resin composition c was injected so as to cover the sphere in an injection molding machine to form a cover. The thickness of the cover was 1.05 mm.

A clear paint including a two-component curing type polyurethane as a base material was applied to this cover to obtain a golf ball of Example 1 having a diameter of about 42.7 mm and a mass of about 45.5 g.

Examples 2 to 9 and Comparative Examples 1 to 8

Golf balls of Examples 2 to 9 and Comparative Examples 1 to 8 were obtained in the same manner as Example 1, except that the specifications of the core, the mid layer, and the cover were set as shown in Tables 6 to 8 below. The specifications of the core are shown in Tables 1 to 3 below. The compositions of the mid layer and the cover are shown in Tables 4 and 5 below.

TABLE 1

| Specifications of core | | | | | |
|---|---|---|---|---|---|
| | A | B | C | D | E1 |
| Diameter | 38.4 | 38.4 | 38.6 | 38.6 | 38.6 |
| Polybutadiene | 100 | 100 | 100 | 100 | 100 |
| Zinc acrylate | 26.2 | 30.2 | 27.2 | 31.2 | 28.2 |
| Zinc oxide | 5 | 5 | 5 | 5 | 5 |
| Barium sulfate | 17.9 | 16.4 | 17.6 | 16.0 | 17.2 |
| Dicumyl peroxide | 1.2 | 1.2 | 1.2 | 1.2 | 1.2 |
| Radical scavenger | 1.0 | 1.5 | 1.0 | 1.5 | 1.0 |
| Terpene-based resin | — | — | — | — | — |
| Dibutylhydroxytoluene | — | — | — | — | — |
| Benzoic acid | — | — | — | — | — |
| Organic sulfur compound | 0.35 | 0.50 | 0.35 | 0.50 | 0.35 |
| Crosslinking temperature [° C.] | 170 | 170 | 170 | 170 | 170 |
| Compressive deformation Dc [mm] | 4.10 | 4.10 | 3.95 | 3.95 | 3.80 |
| Hardness [Shore C] Ho | 61 | 56 | 63 | 58 | 65 |
| H(2.5) | 64 | 60 | 66 | 62 | 68 |
| H(5.0) | 65 | 62 | 68 | 64 | 70 |
| H(7.5) | 67 | 64 | 69 | 66 | 71 |
| H(10.0) | 68 | 66 | 70 | 68 | 72 |
| H(12.5) | 70 | 65 | 72 | 67 | 74 |
| H(15.0) | 71 | 63 | 73 | 65 | 75 |
| Hs | 73 | 65 | 75 | 67 | 77 |
| Hs − Ho | 12 | 9 | 12 | 9 | 12 |
| Slope A1 | 1.20 | 1.60 | 1.20 | 1.60 | 1.20 |
| A2 | 0.40 | 0.80 | 0.80 | 0.80 | 0.80 |
| A3 | 0.80 | 0.80 | 0.40 | 0.80 | 0.40 |
| A4 | 0.40 | 0.80 | 0.40 | 0.80 | 0.40 |
| A5 | 0.80 | −0.40 | 0.80 | −0.40 | 0.80 |
| A6 | 0.40 | −0.80 | 0.40 | −0.80 | 0.40 |
| A7 | 0.48 | 0.48 | 0.47 | 0.47 | 0.47 |
| Amax | 0.80 | 0.80 | 0.80 | 0.80 | 0.80 |

TABLE 2

| Specifications of core | | | | | |
|---|---|---|---|---|---|
| | E2 | F | G | H | I |
| Diameter | 38.8 | 38.8 | 38.6 | 38.6 | 38.6 |
| Polybutadiene | 100 | 100 | 100 | 100 | 100 |
| Zinc acrylate | 28.2 | 32.2 | 29.2 | 25.6 | 27.0 |
| Zinc oxide | 5 | 5 | 5 | 5 | 5 |
| Barium sulfate | 17.2 | 15.6 | 17.2 | 19.0 | 17.6 |
| Dicumyl peroxide | 1.2 | 1.2 | 1.2 | 0.8 | 0.9 |
| Radical scavenger | 1.0 | 1.5 | 1.0 | — | — |
| Terpene-based resin | — | — | — | 2.0 | — |
| Dibutylhydroxytoluene | — | — | — | — | 2.0 |
| Benzoic acid | — | — | — | — | — |
| Organic sulfur compound | 0.35 | 0.50 | 0.35 | 0.20 | 0.20 |
| Crosslinking temperature [° C.] | 170 | 170 | 170 | 165 | 170 |
| Compressive deformation Dc [mm] | 3.80 | 3.80 | 3.65 | 4.00 | 3.80 |
| Hardness [Shore C] Ho | 65 | 60 | 67 | 63 | 61 |
| H(2.5) | 68 | 64 | 70 | 65 | 66 |
| H(5.0) | 70 | 66 | 72 | 67 | 70 |
| H(7.5) | 71 | 68 | 73 | 69 | 72 |
| H(10.0) | 72 | 70 | 74 | 70 | 73 |
| H(12.5) | 74 | 69 | 76 | 71 | 76 |
| H(15.0) | 75 | 67 | 77 | 72 | 78 |
| Hs | 77 | 69 | 79 | 75 | 82 |
| Hs − Ho | 12 | 9 | 12 | 12 | 21 |
| Slope A1 | 1.20 | 1.60 | 1.20 | 0.80 | 2.00 |
| A2 | 0.80 | 0.80 | 0.80 | 0.80 | 1.60 |
| A3 | 0.40 | 0.80 | 0.40 | 0.80 | 0.80 |
| A4 | 0.40 | 0.80 | 0.40 | 0.40 | 0.40 |
| A5 | 0.80 | −0.40 | 0.80 | 0.40 | 1.20 |
| A6 | 0.40 | −0.80 | 0.40 | 0.40 | 0.80 |
| A7 | 0.45 | 0.45 | 0.47 | 0.70 | 0.93 |
| Amax | 0.80 | 0.80 | 0.80 | 0.80 | 1.60 |

Terpene-based resin: trade name "SYLVARES TP2019", manufactured by KRATON Corporation

TABLE 3

| Specifications of core | | | | |
|---|---|---|---|---|
| | J | K | L | M |
| Diameter | 38.6 | 38.6 | 38.6 | 38.6 |
| Polybutadiene | 100 | 100 | 100 | 100 |
| Zinc acrylate | 27.2 | 26.4 | 26.0 | 33.9 |
| Zinc oxide | 5 | 5 | 10 | 10 |
| Barium sulfate | 17.6 | 22.7 | 13.0 | 8.6 |
| Dicumyl peroxide | 1.2 | 0.6 | 0.9 | 1.1 |
| Radical scavenger | 1.0 | — | — | — |
| Terpene-based resin | — | — | — | — |
| Dibutylhydroxytoluene | — | — | — | — |
| Benzoic acid | — | — | 2.0 | 3.0 |
| Organic sulfur compound | 0.35 | 0.63 | 0.56 | 0.84 |
| Crosslinking temperature [° C.] | 155 | 170 | 160 | 160 |
| Compressive deformation Dc [mm] | 4.00 | 3.80 | 3.75 | 3.70 |
| Hardness [Shore C] Ho | 67 | 61 | 56 | 53 |
| H(2.5) | 68 | 66 | 61 | 59 |
| H(5.0) | 70 | 69 | 65 | 64 |
| H(7.5) | 73 | 70 | 66 | 66 |
| H(10.0) | 72 | 70 | 67 | 68 |
| H(12.5) | 72 | 73 | 72 | 75 |
| H(15.0) | 69 | 76 | 78 | 81 |
| Hs | 70 | 81 | 83 | 85 |
| Hs − Ho | 2.75 | 20 | 27 | 32 |
| Slope A1 | 0.54 | 2.00 | 2.00 | 2.40 |
| A2 | 0.75 | 1.20 | 1.60 | 2.00 |
| A3 | 0.97 | 0.40 | 0.40 | 0.80 |
| A4 | −0.02 | 0.00 | 0.40 | 0.80 |
| A5 | −0.26 | 1.20 | 2.00 | 2.80 |
| A6 | −1.28 | 1.20 | 2.40 | 2.40 |
| A7 | 0.23 | 1.16 | 1.16 | 0.93 |
| Amax | 1.28 | 1.20 | 2.40 | 2.80 |

TABLE 4

| Configuration of resin composition [parts by mass] | | | | |
|---|---|---|---|---|
| Blending formula No | a | b | c | d |
| HIMILAN AM7329 | 40 | 30 | 40 | 40 |
| HIMILAN AM7337 | 20 | 40 | 50 | 30 |
| HIMILAN 1555 | 30 | 25 | 5 | 30 |
| Polyamide 6 | — | — | — | — |
| TEFABLOC T3221C | 10 | 5 | 5 | 1 |
| Barium sulfate | 6 | 6 | 6 | 6 |
| Titanium dioxide | 4 | 4 | 4 | 4 |
| Hardness | 57 | 60 | 62 | 63 |

TABLE 5

| Configuration of resin composition [parts by mass] | | | | |
|---|---|---|---|---|
| Blending formula No | e | f | g | h |
| HIMILAN AM7329 | — | — | — | — |
| HIMILAN AM7337 | — | 40 | 10 | — |
| HIMILAN 1555 | 60 | 20 | 10 | — |
| Polyamide 6 | 40 | 40 | 80 | 100 |
| TEFABLOC T3221C | — | — | — | — |
| Barium sulfate | 6 | 6 | 6 | 6 |
| Titanium dioxide | 4 | 4 | 4 | 4 |
| Hardness | 65 | 67 | 70 | 72 |

Flight Performance

A driver (W #1, trade name "XXIO", manufactured by Sumitomo Rubber Industries, Ltd., shaft hardness: R) was attached to a swing machine manufactured by Golf Laboratories, Inc. A golf ball was hit with this driver under a condition of a head speed of 40 m/sec, and the distance from the launch point to the stop point was measured. During the test, the weather was almost windless. The average value of flight distances obtained by 12 measurements was calculated. Furthermore, the average value was rated based on the following criteria.

A: 220.0 yards or more
B: 219.5 yards or more but less than 220.0 yards
C: 219.0 yards or more but less than 219.5 yards
D: less than 219.0 yards These results are shown in Tables 6 to 8 below.

Feel at Impact

Ten golf players hit golf balls and were asked about feel at impact. The golf balls were rated according to the following criteria based on the number of golf players who answered "the feel at impact was good".

A: 8 or more
B: 5 or more but 7 or less
C: 4 or less

The results are shown in Tables 6 to 8 below.

Overall Evaluation

The golf balls were rated according to the following criteria based om flight performance and feel at impact.

A: Both flight performance and feel at impact are "A".
B: Both flight performance and feel at impact are "A" or "B".
C: One of flight performance and feel at impact is "A" or "B", and the other is "C" or "D".
D: Both flight performance and feel at impact are "C" or "D".

The results are shown in Tables 6 to 8 below.

TABLE 6

| Evaluation results | Comp. Ex. 1 | Comp. Ex. 2 | Comp. Ex. 3 | Ex. 1 | Ex. 2 | Ex 3 |
|---|---|---|---|---|---|---|
| Core | | | | | | |
| Diameter [mm] | 38.6 | 38.6 | 38.6 | 38.6 | 38.6 | 38.4 |
| Composition | H | I | J | C | D | A |
| Compression Dc [mm] | 4.00 | 3.80 | 4.00 | 3.95 | 3.95 | 4.10 |
| Hs − Ho [Shore C] | 12 | 21 | 3 | 12 | 9 | 12 |
| A1 | 0.80 | 2.00 | 0.54 | 1.20 | 1.60 | 1.20 |
| Amax | 0.80 | 1.60 | 1.28 | 0.80 | 0.80 | 0.80 |
| Mid layer | | | | | | |
| Composition | h | g | f | f | f | f |
| Thickness [mm] | 1.00 | 1.00 | 1.00 | 1.00 | 1.00 | 1.05 |
| Hm [Shore D] | 72 | 70 | 67 | 67 | 67 | 67 |
| Cover | | | | | | |
| Composition | d | b | c | c | c | c |
| Thickness [mm] | 1.05 | 1.05 | 1.05 | 1.05 | 1.05 | 1.10 |
| Hc [Shore D] | 63 | 60 | 62 | 62 | 62 | 62 |
| Ball | | | | | | |
| Diameter [mm] | 42.7 | 42.7 | 42.7 | 42.7 | 42.7 | 42.7 |
| Compression Db [mm] | 2.82 | 2.82 | 2.90 | 2.90 | 2.90 | 2.90 |
| Hm − Hc | 9.0 | 10.0 | 5.0 | 5.0 | 5.0 | 5.0 |
| Flight test | | | | | | |
| Flight distance [yds] | 219.3 | 218.7 | 218.8 | 220.1 | 220.2 | 220.3 |
| Rating | C | D | D | A | A | A |
| Feel at impact | C | B | A | A | A | B |
| Overall evaluation | D | C | C | A | A | B |

TABLE 7

| Evaluation results | Ex. 4 | Ex. 5 | Ex. 6 | Ex. 7 | Ex. 8 | Ex. 9 |
|---|---|---|---|---|---|---|
| Core | | | | | | |
| Diameter [mm] | 38.4 | 38.8 | 38.8 | 38.6 | 38.6 | 38.6 |
| Composition | B | E2 | F | E1 | E1 | G |
| Compression Dc [mm] | 4.10 | 3.80 | 3.80 | 3.80 | 3.80 | 3.65 |
| Hs − Ho [Shore C] | 9 | 12 | 9 | 12 | 12 | 12 |
| A1 | 1.60 | 1.20 | 1.60 | 1.20 | 1.20 | 1.20 |
| Amax | 0.80 | 0.80 | 0.80 | 0.80 | 0.80 | 0.80 |
| Mid layer | | | | | | |
| Composition | f | f | f | g | g | e |
| Thickness [mm] | 1.05 | 0.95 | 0.95 | 1.00 | 1.00 | 1.00 |
| Hm [Shore D] | 67 | 67 | 67 | 70 | 70 | 65 |
| Cover | | | | | | |
| Composition | c | c | c | b | c | d |
| Thickness [mm] | 1.10 | 1.00 | 1.00 | 1.05 | 1.05 | 1.05 |
| Hc [Shore D] | 62 | 62 | 62 | 60 | 62 | 63 |
| Ball | | | | | | |
| Diameter [mm] | 42.7 | 42.7 | 42.7 | 42.7 | 42.7 | 42.7 |
| Compression Db [mm] | 2.90 | 2.90 | 2.90 | 2.90 | 2.90 | 2.90 |
| Hm − Hc | 5.0 | 5.0 | 5.0 | 10.0 | 8.0 | 2.0 |
| Flight test | | | | | | |
| Flight distance [yds] | 220.4 | 220.0 | 220.1 | 219.5 | 219.6 | 220.1 |
| Rating | A | A | A | B | B | A |
| Feel at impact | B | A | A | B | B | A |
| Overall evaluation | B | A | A | B | B | A |

TABLE 8

| Evaluation results | Comp. Ex. 4 | Comp. Ex. 5 | Comp. Ex. 6 | Comp. Ex. 7 | Comp. Ex. 8 |
|---|---|---|---|---|---|
| Core | | | | | |
| Diameter [mm] | 38.6 | 38.6 | 38.6 | 38.6 | 38.6 |
| Composition | K | L | M | H | C |
| Compression Dc [mm] | 3.80 | 3.75 | 3.70 | 4.00 | 3.95 |
| Hs − Ho [Shore C] | 22 | 27 | 32 | 12 | 12 |
| A1 | 2.00 | 2.00 | 2.40 | 0.80 | 1.20 |
| Amax | 1.20 | 2.40 | 2.80 | 0.80 | 0.80 |
| Mid layer | | | | | |
| Composition | f | f | f | f | a |
| Thickness [mm] | 1.00 | 1.00 | 1.00 | 1.00 | 1.00 |
| Hm [Shore D] | 67 | 67 | 67 | 67 | 57 |
| Cover | | | | | |
| Composition | c | C | C | c | C |
| Thickness [mm] | 1.05 | 1.05 | 1.05 | 1.05 | 1.05 |
| Hc [Shore D] | 62 | 62 | 62 | 62 | 62 |
| Ball | | | | | |
| Diameter [mm] | 42.7 | 42.7 | 42.7 | 42.7 | 42.7 |
| Compression Db [mm] | 2.90 | 2.90 | 2.90 | 2.90 | 2.90 |
| Hm − Hc | 5.0 | 5.0 | 5.0 | 5.0 | −5.0 |
| Flight test | | | | | |
| Flight distance [yds] | 218.9 | 219.3 | 219.2 | 219.4 | 218.0 |
| Rating | D | C | C | C | D |
| Feel at impact | A | A | A | A | A |
| Overall evaluation | C | C | C | C | C |

As shown in Tables 6 to 8, the golf ball of each Example has excellent overall performance. From the evaluation results, advantages of the present disclosure are clear.

Disclosure Items

Each of the following items can be regarded as a disclosure of one or more embodiments of the present disclosure.

[Item 1]

A golf ball can include a core having a diameter of not less than 35 mm, a mid layer positioned outside the core, and a cover positioned outside the mid layer, wherein a Shore D hardness Hm of the mid layer is larger than a Shore D hardness Hc of the cover, in a graph on which distances (mm) of and Shore C hardnesses at a central point of the core, a first point whose distance from the central point is 2.5 mm, a second point whose distance from the central point is 5.0 mm, a third point whose distance from the central point is 7.5 mm, a fourth point whose distance from the central point is 10.0 mm, a fifth point whose distance from the central point is 12.5 mm, a sixth point whose distance from the central point is 15.0 mm, and a point on a surface of the core, are plotted, a slope A1 of a straight line connecting the central point and the first point is not less than 1.00, and a maximum value Amax of absolute values of the following slopes A2 to A7 is not greater than 0.90, A2: a slope of a straight line connecting the first point and the second point, A3: a slope of a straight line connecting the second point and the third point, A4: a slope of a straight line connecting the third point and the fourth point, A5: a slope of a straight line connecting the fourth point and the fifth point, A6: a slope of a straight line connecting the fifth point and the sixth point, and A7: a slope of a straight line connecting the sixth point and the point on the surface.

Item 2

The golf ball according to Item 1, wherein the Shore C hardness Hs at the surface of the core is larger than the hardness Ho at the central point of the core, and a difference (Hs−Ho) between the hardness Hs and the hardness Ho is less than 15.

Item 3

The golf ball according to Item 1 or 2, wherein a difference (Hm−Hc) between the hardness Hm and the hardness Hc is not greater than 10.

Item 4

The golf ball according to any one of Items 1 to 3, wherein the hardness Hm is not less than 65, and the hardness Hc is not less than 60.

Item 5

The golf ball according to any one of Items 1 to 4, wherein the core is formed by crosslinking a rubber composition, and the rubber composition contains (a) a base rubber, (b) a co-crosslinking agent, (c) a crosslinking initiator, and (d) a radical scavenger.

Item 6

The golf ball according to Item 5, wherein the radical scavenger (d) is a hindered phenol-based compound (d1) and/or a hindered amine-based compound (d2).

Item 7

The golf ball according to Item 6, wherein the radical scavenger (d) is one or more compounds selected from the group consisting of 4,4'-butylidenebis(3-methyl-6-tert-butylphenol), 2,6-di-tert-butyl-4-((2-((3,5-di-tert-butyl-4-hydroxyphenyl)sulfanyl)propan-2-yl)sulfanyl)phenol, and 2-tert-butyl-6-(3-tert-butyl-2-hydroxy-5-methylbenzyl)-4-methylphenyl acrylate.

Item 8

The golf ball according to any one of Items 5 to 7, wherein the rubber composition contains 100 parts by mass of the base rubber (a) and 0.5 parts by mass or greater and 4.0 parts by mass or less of the radical scavenger (d).

Item 9

The golf ball according to any one of Items 5 to 8, wherein the rubber composition further contains (e) an organic sulfur compound, and the organic sulfur compound is one or more compounds selected from the group consisting of thiols, polysulfides, thiurams, thiocarboxylic acids, dithiocarboxylic acids, sulfenamides, dithiocarbamates, and thiazoles.

Item 10

The golf ball according to any one of Items 5 to 9, wherein the rubber composition contains an organic sulfur compound.

Item 11

The golf ball according to any one of Items 5 to 10, wherein an amount of the organic sulfur compound per 100 parts by mass of the base rubber is not less than 0.05 parts by mass and not greater than 5.0 parts by mass.

Item 12

The golf ball according to any one of Items 5 to 11, wherein the core has a diameter of not less than 35.0 mm and not greater than 40.5 mm, and the core has an amount of compressive deformation of not less than 3.0 mm and not greater than 5.0 mm.

Item 13

The golf ball according to any one of Items 5 to 12, wherein the golf ball has an amount of compressive deformation of not less than 2.5 mm and not greater than 4.0 mm.

Item 14

The golf ball according to any one of Items 5 to 13, wherein the golf ball has an amount of compressive deformation of not less than 2.5 mm and not greater than 4.0 mm.

Item 15

The golf ball according to any one of Items 5 to 14, wherein the hardness Hs at the surface is larger than the hardness Ho at the central point.

Item 16

The golf ball according to any one of Items 5 to 15, wherein the core is formed by crosslinking a rubber composition, and the rubber composition consists of:

(a) a base rubber, (b) a co-crosslinking agent, (c) a crosslinking initiator, and (d) a radical scavenger.

The above-described golf ball is suitable for, for example, playing golf on golf courses and practicing at driving ranges.

What is claimed is:

1. A golf ball comprising:

a core having a diameter of not less than 35 mm, a mid layer outside the core, and a cover outside the mid layer, wherein a Shore D hardness Hm of the mid layer is larger than a Shore D hardness Hc of the cover, in a graph on which distances (mm) of and Shore C hardnesses at a central point of the core Ho, a first point whose distance from the central point is 2.5 mm, a second point whose distance from the central point is 5.0 mm, a third point whose distance from the central point is 7.5 mm, a fourth point whose distance from the central point is 10.0 mm, a fifth point whose distance from the central point is 12.5 mm, a sixth point whose distance from the central point is 15.0 mm, and a point on a surface of the core Hs, are plotted, a slope A1 of a straight line connecting the central point and the first point is not less than 1.00, and a maximum value Amax of absolute values of the following slopes A2 to A7 is not greater than 0.90, A2: a slope of a straight line connecting the first point and the second point, A3: a slope of a straight line connecting the second point and the third point, A4: a slope of a straight line connecting the third point and the fourth point, A5: a slope of a straight line connecting the fourth point and the fifth point, A6: a slope of a straight line connecting the fifth point and the sixth point, and A7: a slope of a straight line connecting the sixth point and the point on the surface.

2. The golf ball according to claim 1, wherein the Shore C hardness Hs at the surface of the core is larger than the hardness Ho at the central point of the core, and a difference (Hs−Ho) between the hardness Hs and the hardness Ho is less than 15.

3. The golf ball according to claim 1, wherein a difference (Hm-Hc) between the hardness Hm and the hardness Hc is not greater than 10.

4. The golf ball according to claim 1, wherein the hardness Hm is not less than 65, and the hardness Hc is not less than 60.

5. The golf ball according to claim 1, wherein the core comprises a crosslinked rubber composition, and the crosslinked rubber composition includes:

(a) a base rubber, (b) a co-crosslinking agent, (c) a crosslinking initiator, and (d) a radical scavenger.

6. The golf ball according to claim 5, wherein the radical scavenger (d) is a hindered phenol-based compound (d1) and/or a hindered amine-based compound (d2).

7. The golf ball according to claim 6, wherein the radical scavenger (d) is one or more compounds selected from the group consisting of 4,4'-butylidenebis(3-methyl-6-tert-butylphenol), 2,6-di-tert-butyl-4-((2-((3,5-di-tert-butyl-4-hydroxyphenyl)sulfanyl) propan-2-yl)sulfanyl)phenol, and 2-tert-butyl-6-(3-tert-butyl-2-hydroxy-5-methylbenzyl)-4-methylphenyl acrylate.

8. The golf ball according to claim 5, wherein the rubber composition contains 100 parts by mass of the base rubber (a) and 0.5 parts by mass or greater and 4.0 parts by mass or less of the radical scavenger (d).

9. The golf ball according to claim 5, wherein the rubber composition further contains (e) an organic sulfur compound, and the organic sulfur compound is one or more compounds selected from the group consisting of thiols, polysulfides, thiurams, thiocarboxylic acids, dithiocarboxylic acids, sulfenamides, dithiocarbamates, and thiazoles.

10. The golf ball according to claim 5, wherein the rubber composition contains an organic sulfur compound.

11. The golf ball according to claim 10, wherein an amount of the organic sulfur compound per 100 parts by mass of the base rubber is not less than 0.05 parts by mass and not greater than 5.0 parts by mass.

12. The golf ball according to claim 1, wherein the core has a diameter of not less than 35.0 mm and not greater than 40.5 mm, and the core has an amount of compressive deformation when applying a load from an initial load of 98 N to a final load of 1274 N of not less than 3.0 mm and not greater than 5.0 mm.

13. The golf ball according to claim 12, wherein the amount of compressive deformation when applying a load from an initial load of 98 N to a final load of 1274 N is not less than 2.5 mm and not greater than 4.0 mm.

14. The golf ball according to claim 1, wherein the golf ball has an amount of compressive deformation when applying a load from an initial load of 98 N to a final load of 1274 N of not less than 2.5 mm and not greater than 4.0 mm.

15. The golf ball according to claim 1, wherein the hardness Hs at the surface is larger than the hardness Ho at the central point.

16. The golf ball according to claim 1, wherein the core comprises a crosslinked rubber composition, and the cross-linked rubber composition consists of:

(a) a base rubber, (b) a co-crosslinking agent, (c) a crosslinking initiator, and (d) a radical scavenger.

17. The golf ball according to claim 1, wherein the mid layer has a thickness Tm of not less than 0.5 mm and not greater than 2.0 mm.

18. The golf ball according to claim 1, wherein the cover has a thickness Tm of not less than 0.50 mm and not greater than 2.00 mm.

* * * * *